United States Patent [19]

Dobbs et al.

[11] Patent Number: 5,364,046
[45] Date of Patent: Nov. 15, 1994

[54] AUTOMATIC COMPLIANT CAPTURE AND DOCKING MECHANISM FOR SPACECRAFT

[75] Inventors: Michael E. Dobbs, Brighton; Peter Tchoryk, Jr., Whitmore Lake; Donald B. Jones, Ann Arbor, all of Mich.

[73] Assignee: Environmental Research Institute of Michigan, Ann Arbor, Mich.

[21] Appl. No.: 839,996

[22] Filed: Feb. 24, 1992

[51] Int. Cl.$^5$ ............................................... B64G 1/62
[52] U.S. Cl. .................................... 244/161; 292/252
[58] Field of Search ................ 244/158, 161; 403/322, 403/324, 325; 292/252

[56] References Cited

U.S. PATENT DOCUMENTS

| | | | |
|---|---|---|---|
| 2,199,588 | 5/1940 | Cobham et al. | 244/135 |
| 2,761,636 | 9/1956 | Finlay | 244/133 |
| 3,201,065 | 8/1965 | Dunn | 244/1 |
| 3,389,877 | 6/1968 | Huber et al. | 244/1 |
| 3,508,723 | 4/1970 | Warren et al. | 244/161 |
| 3,737,117 | 6/1973 | Belew | 244/1 SD |
| 3,753,536 | 8/1973 | White | 244/1 SD |
| 4,083,520 | 4/1978 | Rupp et al. | 244/167 |
| 4,177,964 | 12/1979 | Hujsak et al. | 244/161 |
| 4,195,804 | 4/1980 | Hujsak et al. | 244/161 |
| 4,431,333 | 2/1984 | Chandler | 244/161 |
| 4,500,057 | 2/1985 | Duwelz | 244/161 |
| 4,607,815 | 8/1986 | Turci et al. | 244/161 |
| 4,709,454 | 12/1987 | Barnes | 403/322 |
| 4,712,753 | 12/1987 | Howard | 244/161 |
| 4,906,123 | 3/1990 | Weskamp et al. | 403/322 |

Primary Examiner—Michael S. Huppert
Assistant Examiner—Virna Lissi Ansley
Attorney, Agent, or Firm—Krass & Young

[57] ABSTRACT

This invention is an automatic capture and docking mechanism for a pair of spacecraft. A largely passive capture mechanism disposed on a first spacecraft includes a concave cone section with the narrower interior end to admit a ball of a predetermined diameter. When tripped, a capture device restricts the diameter of passage for capture of the ball. In the release position passage for the ball is unrestricted. The capture device is preferably reset by the other spacecraft to release the ball. A docking mechanism disposed on the second spacecraft includes a convex cone section constructed to mate with the concave cone section, ball at the end of a cable and a boom. The cable may be extended from or retracted to the apex of the convex cone section. A rotary drive coupled to the convex cone section permits relative rotation of the spacecraft. The boom may be extended from or retracted into the second spacecraft. The spacecraft dock by directing the extended ball into the cylinder, where it is captured. The cable and boom retract to dock. The active docking mechanism releases and resets the capture device to undock. A pyrotechnic cutter disposed inside the boom can cut the cable for emergency release.

30 Claims, 5 Drawing Sheets

AUTOMATIC COMPLIANT CAPTURE AND DOCKING MECHANISM FOR SPACECRAFT The invention of this application was supported in part by grant no. NAGW-1198 awarded by the National Aeronautics and Space Administration. The United States government has certain rights in this application.

TECHNICAL FIELD OF THE INVENTION

The field of this invention is that of automatic capture and docking mechanisms for spacecraft.

BACKGROUND OF THE INVENTION

There is interest in commercial uses of outer space, particularly earth orbit. This environment offers unique characteristics, such as zero gravity and unlimited vacuum, that may be very useful to certain high value added manufacturing processes. The major problem with exploiting these features of the earth orbit environment is the costs in launch and recovery of payloads. One possible solution to the problems of launch and recovery involves a semi-permanent orbiting vehicle that is periodically serviced for refueling, resupply, servicing, and exchange of processed payloads for new unprocessed payloads. The most economical manner of doing these operations involves unmanned, unsupervised, autonomous rendezvous and docking vehicles. This puts an emphasis on mechanisms for capture and docking that are simple, reliable and capable of operation during some misalignment. In addition, it would also be advantageous that the mechanism aboard the normally orbiting craft be largely passive, not requiring power for most operations. This preserves resources in this critical component of the system for more effective use.

SUMMARY OF THE INVENTION

This invention is an automatic capture and docking mechanism for a pair of spacecraft. This automatic capture and docking mechanism uses a largely passive capture mechanism in a first spacecraft and an active docking mechanism in a second spacecraft. The capture mechanism is passive in the sense that it does not require continuous electrical power when standing by for capture or during capture. The combined mechanism mates a concave cone section in the first spacecraft with a convex cone section in the second spacecraft.

A passive capture mechanism is disposed on a first spacecraft. This includes a concave cone section with the narrower end on the interior. This narrower end has a diameter selected to admit a ball of a predetermined diameter. An end cylinder having this same diameter joins the narrower end of the concave cone section.

The end cylinder includes a capture device having a capture position and a release position. In the release position the capture device is armed. Entry of a ball of the predetermined diameter with a small force sufficient to overcome a trip spring trips the capture device to the capture position. In the capture position the capture device intrudes radially into the end cylinder and restricts the diameter of passage for capture of the ball of the predetermined diameter. The capture device retracts into the release position permitting unrestricted passage of such a ball. A biasing device, such as a spring, urges the capture device toward the capture position.

The capture device preferably includes plural balls disposed radially in openings in the end cylinder. An outer sliding cylinder controls whether these capture balls intrude into the end cylinder (the capture position) or are permitted to withdraw from the end cylinder (the release position). In the capture position the outer sliding cylinder restrains the capture balls causing them to intrude into the end cylinder. In the release position a groove in the outer sliding cylinder permits the capture balls to withdraw from the end cylinder. This allows free passage of the ball in or out of the capture device. A plunger spring urges the outer sliding cylinder toward the capture position from the release position. The groove preferably includes a slant edge that forces the capture balls into the holes of the end cylinder when tripped.

A trip mechanism normally holds the capture device in the release position by restraining the plunger spring. When tripped by a ball of the predetermined diameter, the trip mechanism permits the plunger spring to move the capture device to the capture position. In the preferred embodiment the end cylinder includes an additional set of holes farther from the end of the concave cone section. Each of these trip holes contains a trip ball. The outer sliding cylinder includes a similar groove and slant edge controlling the placement of these trip balls. These grooves are aligned so that the outer sliding cylinder controls the capture balls and the trip balls identically. An inner sliding cylinder disposed within the end cylinder has a shoulder opposite the trip holes. In the release position this shoulder retains the trip balls in said release position, preventing the plunger spring from moving the outer sliding cylinder to the capture position. A trip spring retains the shoulder of the inner sliding cylinders in position to restrain the trip balls. Pressure on the inner sliding cylinder of a force sufficient to overcome this trip spring permits the trip balls to intrude into a groove in the inner sliding cylinder. This releases the outer sliding cylinder, which rapidly advances to the capture position forcing both the capture balls and the trip balls into the end cylinder. The capture balls are behind the ball of predetermined diameter, thereby restricting its movements.

This capture mechanism includes a setting device for setting the capture mechanism to the capture position. The setting device moves the outer sliding cylinder against its plunger spring. When the outer sliding cylinder places the release groove opposite the trip hole, the trip spring causes a sloped face of a trip groove to push the trip balls into the trip holes and into the trip groove in the outer sliding cylinder. This serves to restrain the plunger spring from advancing the outer sliding cylinder to the capture position. The outer sliding cylinder may be pulled back by: a lever and push rod operated from the second spacecraft; an electromagnet powered from the either the first or second spacecraft; or a cam assembly driven by a motor powered from the either the first or second spacecraft.

The docking mechanism disposed on the second spacecraft includes a convex cone section constructed to mate with the concave cone section of the first spacecraft. This docking mechanism also includes a ball of a diameter to enter the end cylinder at the end of a cable. The cable may be extended from or retracted into the apex of the convex cone section. The cable must have some compression strength as well as tensile strength and must have a predetermined bending springiness. The cable preferably includes a tightly wound spring to impart the compression strength and bending springiness. In the preferred embodiment the cable drive is a rotatable screw and a traveling nut coupled to the cable. The docking mechanism also includes a rotary drive coupled to the convex cone section. This rotary drive permits relative rotation of the spacecraft. The convex cone section is preferably mounted on the end of a boom that may be extended from or retracted into the second spacecraft. The boom preferably includes a brake to dissipate the closing kinetic energy of the spacecraft. An explosive bolt-like mechanism disposed inside the boom can cut the cable for emergency release.

The automatic capture and docking mechanism is used in the final stages of coupling the two spacecraft. The spacecraft approach with the cylindrical boom and cable extended. The ball is directed toward concave cone section of the first spacecraft. The conical surface directs ball toward end cylinder even if initially misaligned. Upon reaching the end cylinder, the ball trips the capture mechanism that secures the ball. Cable needs sufficient stiffness to trip this capture mechanism. Once the ball is secured, the cable is retracted. This results in mating of the concave and convex cone sections. The boom brake absorbs the kinetic energy of the closing velocity of the spacecraft. Rotation of the convex cone section relative to the boom can correct any rotary misalignment of the spacecraft. Lastly, the boom retracts bringing the spacecraft into mating proximity. The spacecraft are then docked for refueling, resupply, payload exchange, servicing or other operation. The spacecraft are separated by resetting the capture mechanism. The resetting preferably provides a controlled separation pushoff force to separate the spacecraft.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
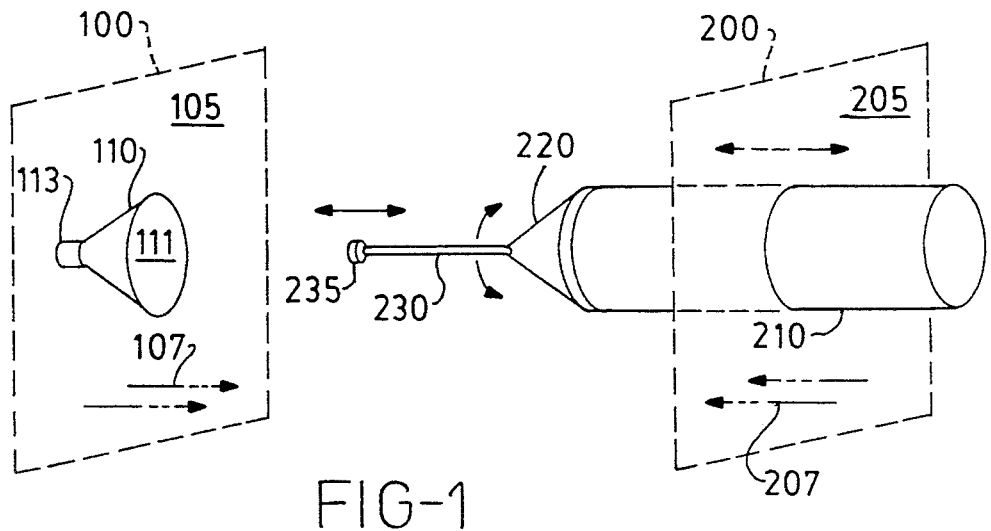
FIG. 1 illustrates an overview of the automatic capture and docking of this invention.

FIG. 1 is an overview of the spacecraft automatic compliant capture and docking mechanism of the present invention. A first spacecraft generally designated 100 includes an outer wall 105. FIG. 1 shows outer wall 105 in phantom because its particular configuration is not important to this invention. Concave cone section 110 includes mouth 111 in outer wall 105. Concave cone section 110 is preferably a section of a 45° cone having an exterior opening of about 12 inches in diameter. End cylinder 113 of a predetermined diameter connects to the narrow, interior end of concave cone section 110. In the preferred embodiment of this invention, the capture mechanism of first spacecraft 100 is passive. This mechanism is passive in the sense that it does not require a source of electric power within first spacecraft 100 during standby for capture nor during capture. First spacecraft 100 includes power supply connector 107 which enables the second spacecraft 200 to supply any electric power needed for release. Thus this capture mechanism is suitable for use with spacecraft having no source of electric power or with spacecraft whose source of electric power is susceptible to exhaustion or failure.

Second spacecraft 200 includes cylindrical boom 210 in outer wall 205. FIG. 1 shows outer wall 205 in phantom since its particular configuration is unimportant to this invention. Cylindrical boom 210 is movable in and out of outer wall 205. Convex cone section 220 is disposed at the exterior end of cylindrical boom 210. Convex cone section 220 mates with concave cone section 110 of first spacecraft 100. Convex cone section 220 may rotate about its axis, which is common to the axis of cylindrical boom 210. Cable 230 emerges from the apex of convex cone section 220. Cable 230 may be extended from or retracted into convex cone section 220. Cable 230 is preferably of a stiff construction having a predetermined bending springiness. Cable 230 may be suitably constructed of multi-strand steel cable inside a wrap spring. This wrap spring provides the requisite compression strength and bending springiness and can be of the type used in drain "snakes." Ball 235 is located at the exterior end of cable 230. Second spacecraft 200 includes power supply connector 207. Power supply connector 207 mates with power supply connector 107 of first spacecraft 100 permitting second spacecraft 200 to power operations of first spacecraft 100 when docked. As detailed below, this power supply coupling permits second spacecraft 200 to power the release of docking.

The automatic capture and docking mechanism of this invention is employed in the final stages of coupling the two spacecraft. As spacecraft 200 approaches spacecraft 100, cylindrical boom 210 and cable 230 are extended. Ball 235 is directed toward concave cone section 110. The interior conical surface of concave cone section 110 directs ball 235 toward end cylinder 113 even if initially misaligned. Upon reaching end cylinder 113, ball 235 trips a capture mechanism that secures ball 235. Cable 230 needs sufficient stiffness to trip the capture mechanism. Once ball 235 is secured, cable 230 is retracted. This results in mating of concave cone section 110 and convex cone section 220. Rotation of convex cone section 220 relative to cylindrical boom 210 corrects any rotary misalignment of the spacecraft. Lastly, cylindrical boom 210 is retracted bringing the spacecraft into mating proximity. This mating proximity couples power supply connectors 107 and 207, which enables second spacecraft 200 to power the release operation. As mentioned above, the exact form of outer walls 105 and 205 is not important to this invention. However, outer walls 105 and 205 must be configured to permit refueling, resupply, servicing or other operation once the spacecraft have docked.

Figure 2:
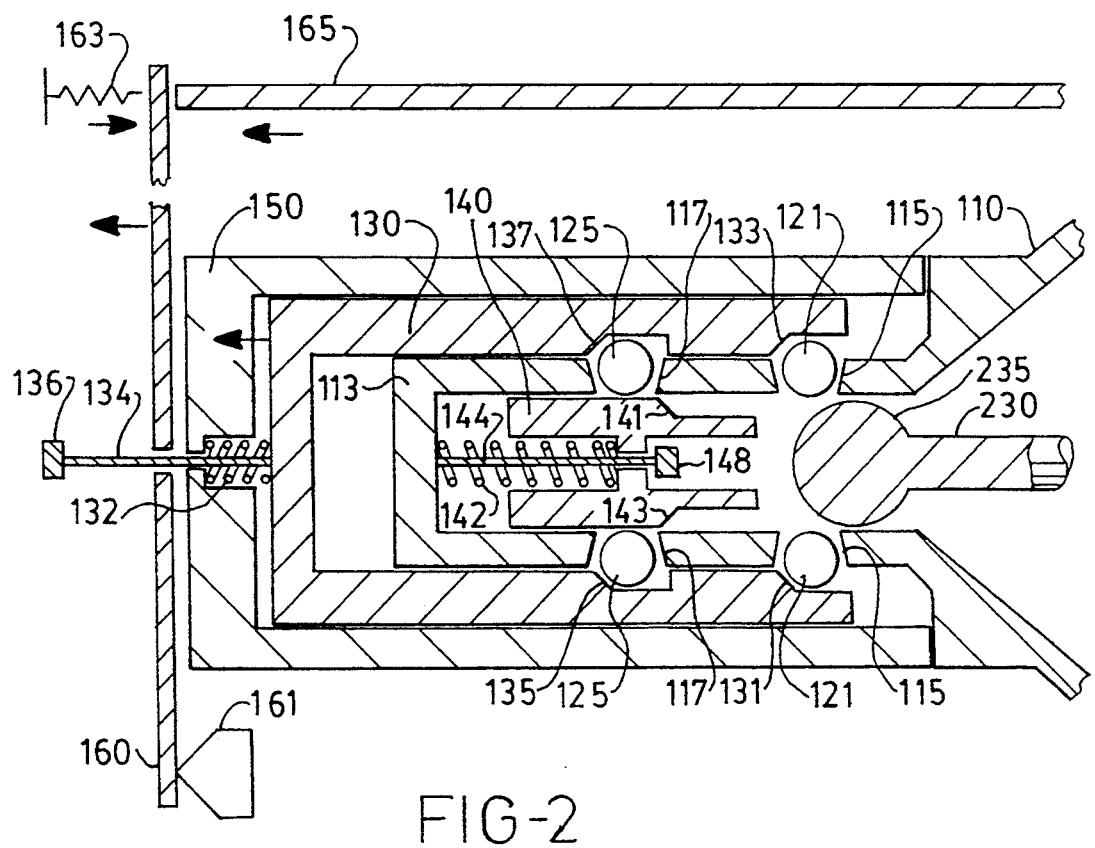
FIG. 2 illustrates a sectional view of one embodiment of the capture mechanism of this invention in the release position showing a lever and rod setting mechanism.

FIG. 2 is a sectional view of the capture mechanism on first spacecraft 100. FIG. 2 shows this capture mechanism in the release position, ready to capture ball 235. In FIG. 2 ball 235 has reached the apex of concave cone section 110 and is just entering end cylinder 113.

End cylinder 113 includes two sets of holes. Capture holes 115 are nearest concave cone section 110. Eight or more of these capture holes 115 are evenly distributed about end cylinder 113. The sectional view of FIG. 2 illustrates only two of these capture holes. A solid capture ball 121 occupies each capture hole 115. A number of such capture balls are needed in order to sufficiently restrict the movement of ball 235. In a similar fashion trip holes 117 are evenly distributed about end cylinder 113 at a location farther from concave cone section 110. Four such trip holes may be adequate. A solid trip ball 125 occupies each trip hole 117. The capture balls 121 and trip balls 125 cooperate with an outer sliding cylinder 130 and an inner sliding cylinder 140 for capture and release of ball 235. The capture mechanism requires fewer trip holes 117 than capture holes 115 because the combination of the trip holes 117 and the trip balls 125 are used differently. Trip holes 117 and trip balls 125 are used to hold outer sliding cylinder 130 in the release position rather than capturing and holding ball 235, which is the function of capture holes 115 and capture balls 121.

Figure 3:
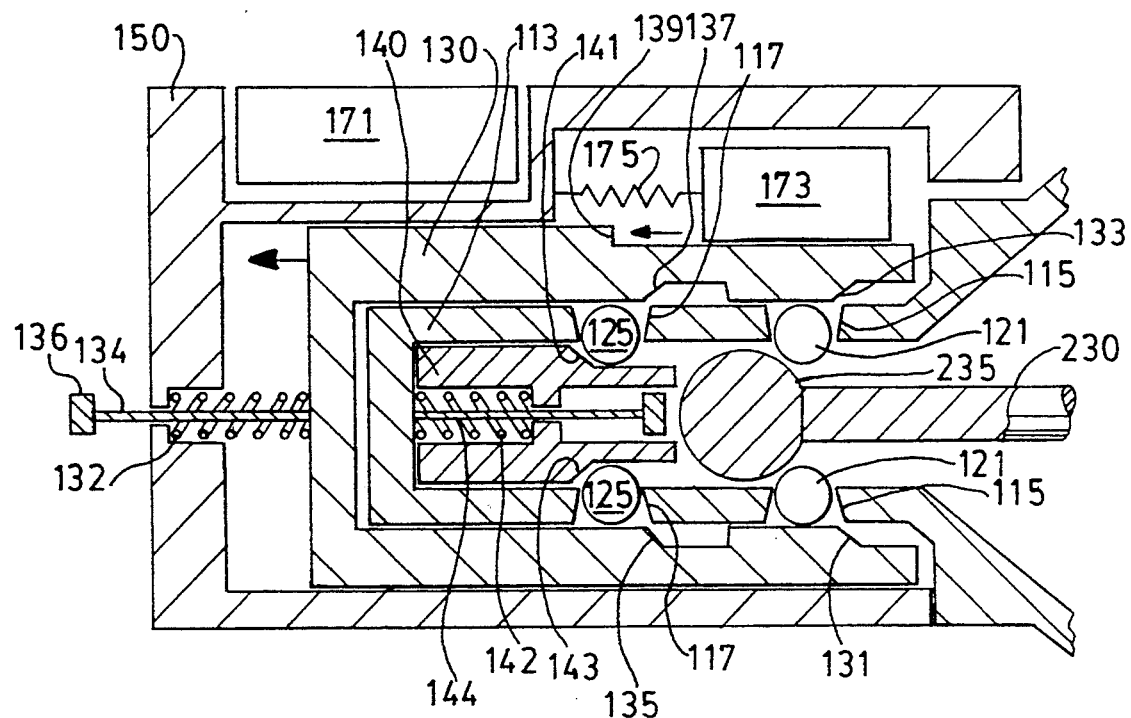
FIG. 3 illustrates a sectional view of an alternative embodiment of the capture mechanism of this invention in the capture position showing an electromagnet setting mechanism.

Outer sliding cylinder 130 is movable between a release position as illustrated in FIG. 2 and a capture position as illustrated in FIG. 3. A spring 132 urges outer sliding cylinder 130 toward the capture position. Note outer fixed cylinder 150 is secured to concave cone section 110. In the release position a capture groove 131 is aligned with capture holes 115. This permits capture balls 121 to move freely within capture holes 115 between a position intruding into end cylinder 113 and a position within capture groove 131. Likewise a release groove 135 of outer sliding cylinder 130 is aligned with trip holes 117 in the release position. Inner sliding cylinder 140 retains trip balls 125 within release groove 135 when in the release position. Spring 142 urges inner sliding cylinder 140 toward the release position, thereby preventing trip balls 125 from intruding into end cylinder 113. Trip balls 125 in turn retain outer sliding cylinder 130 in the release position. Post 144 and end stop 146 limit the movement of inner sliding cylinder 140 under the force of spring 142.

Entry of ball 235 into end cylinder 113 trips the capture mechanism. Ball 235 pushes inner sliding cylinder 140 against spring 142. Note that cable 230 needs sufficient stiffness to overcome spring 142. The capture mechanism trips when trip groove 141 of inner sliding cylinder 140 is opposite trip holes 117. Sloped face 137 of release groove 135 then forces trip balls 125 into trip groove 141. This sloped face 137 provides a component of the force supplied by spring 132 for this purpose. At the same time sloped face 133 of capture groove 131 forces capture balls 121 into end cylinder 113 behind ball 235. Spring 132 preferably has sufficient force to make this capture rapidly with a distinct snap.

FIG. 3 illustrates this capture position. The distance between capture holes 115 and trip holes 117 requires ball 235 to pass capture holes 115 sufficiently to permit capture by capture balls 121 when tripped. As illustrated in FIG. 3, capture balls 121 intrude into end cylinder 113 blocking ball 235 from withdrawing out of end cylinder 113. Outer sliding cylinder 130 restrains capture balls 121 from movement out of this capture position. In this position tension on cable 230 pulls the spacecraft together rather than pulling ball 235 out of end cylinder 113.

FIG. 2 illustrates a construction for release of ball 235. FIG. 2 illustrates a mechanical release mechanism. Lever 160 rotates about fixed pivot 161 engaging end stop 136 on post 134. Spring 163 urges lever 160 toward the unengaged position. Force on push rod 165 in the direction indicated sufficient to overcome spring 163 causes level 160 to engage end stop 136 on post 134. Post 134 pulls outer sliding cylinder 130 away from concave cone section 110. When release groove 135 is opposite trip hole 117, sloped face 143 of trip groove 141 forces trip ball 125 into release groove 135 under the impetus of spring 142. Once trip ball 125 moves out of end cylinder 113, spring 142 forces inner sliding cylinder 140 to end stop 146. This pushes ball 235 out of end cylinder 113. Thus spring 142 helps to separate the two spacecraft. Note that capture balls 121 are pushed into capture holes 115 and capture groove 131 by the passage of ball 235. Thus the capture mechanism releases ball 235 and is again ready to be tripped. Second spacecraft 200 includes a mechanism for operating push rod 165 to release ball 235.

FIG. 3 illustrates an alternative construction for release of ball 235. Electromagnet 171 when energized pulls hammer 173 against spring 175 to contact shoulder 139 of outer sliding cylinder 130. Electromagnet 171 provides sufficient impetus to hammer 173 to push outer sliding cylinder 130 against spring 132 until release groove 135 is opposite trip hole 117. This action may be repeated if the mechanism doesn't release on the first attempt. Thereafter spring 142 drives trip ball 125 into release groove 135, thus placing the mechanism in the release position. This also permits spring 142 to push ball 235 out of end cylinder 130. The electric power used to actuate electromagnet 171 may come from first spacecraft 100, or more preferably from second spacecraft 200.

Figure 4:
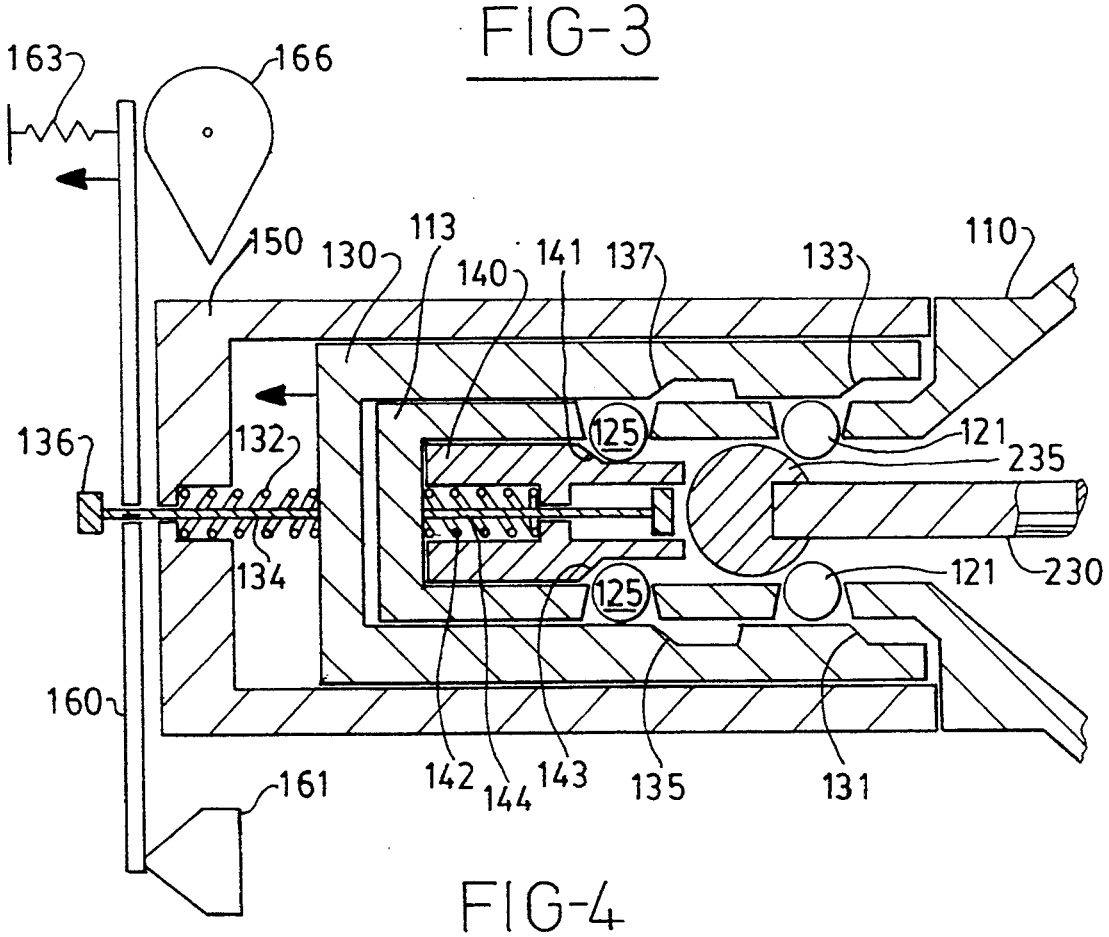
FIG. 4 illustrates a sectional view of a further alternative embodiment of the capture mechanism of this invention in the release position showing a lever and cam setting mechanism.

FIG. 4 illustrates a further alternative construction for release of ball 235. The construction of FIG. 4 is similar to that of FIG. 2. Lever 160 rotates about fixed pivot 161 engaging end stop 136 on post 134. Spring 163 biases lever 160 toward the unengaged position. Cam 166 operates lever 160. FIG. 4 illustrates cam 166 disengaged from level 160 while the capture mechanism is in the release position. When in the capture position, rotation of cam 166 into lever 160 engages end stop 136, pulling outer sliding cylinder 130 until spring 142 resets the capture mechanism in the release position.

Figure 5:
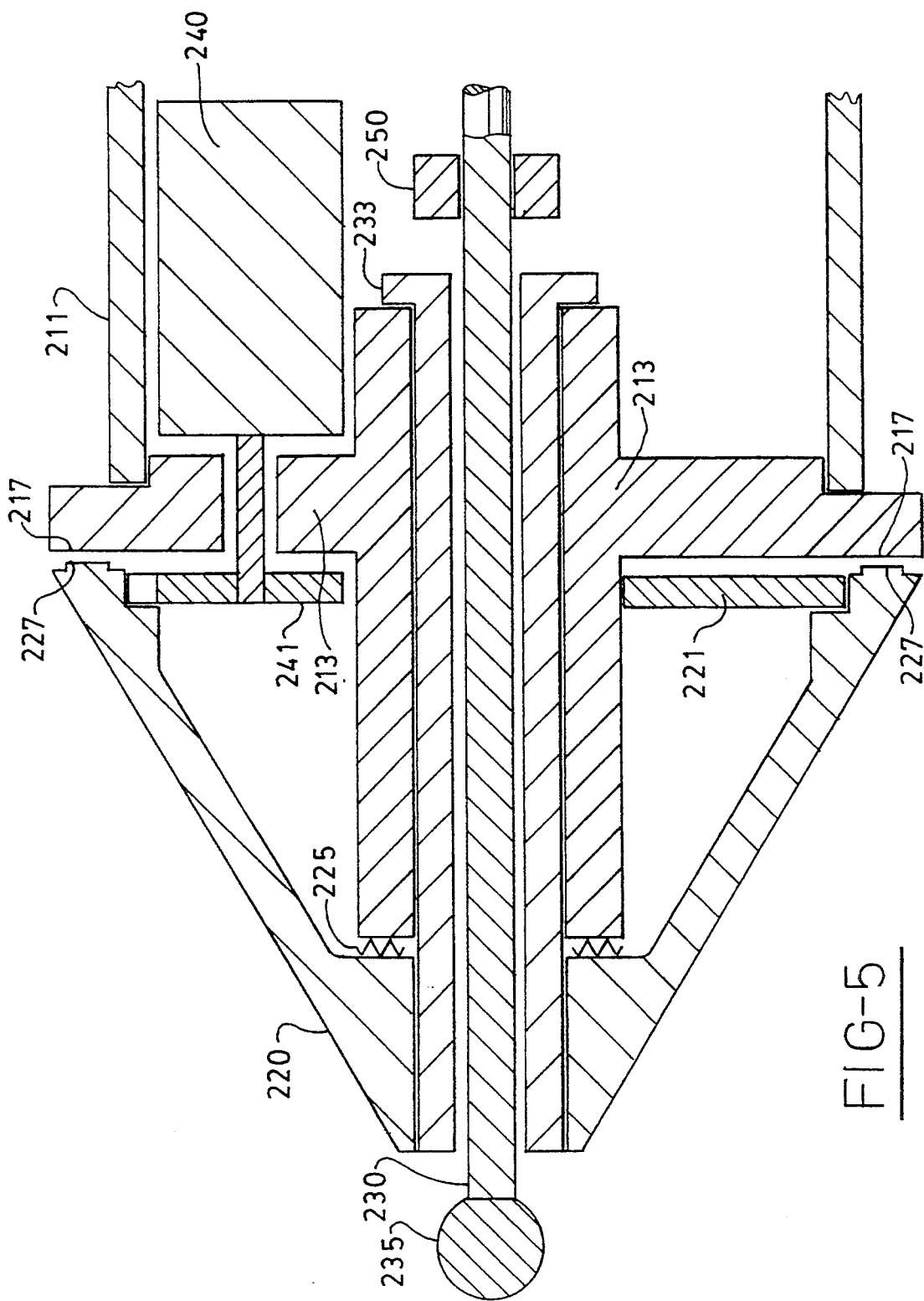
FIG. 5 illustrates a sectional view of one embodiment of the rotatable cone of the docking mechanism.
Figure 6:
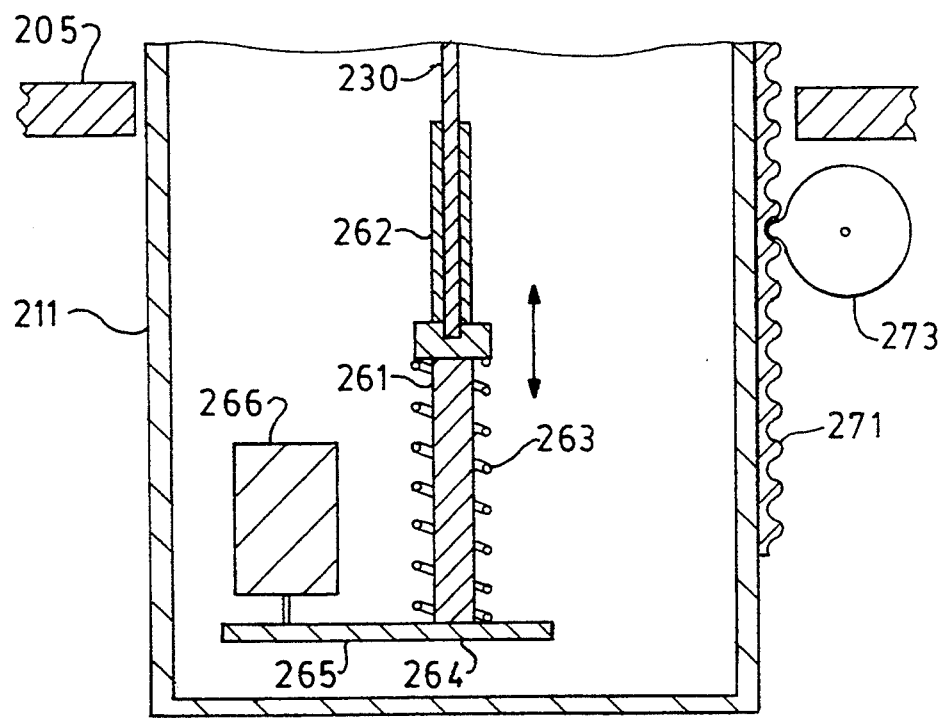
FIG. 6 illustrates a sectional view of one embodiment of the interior portion of the boom of the docking mechanism.
Figure 8:
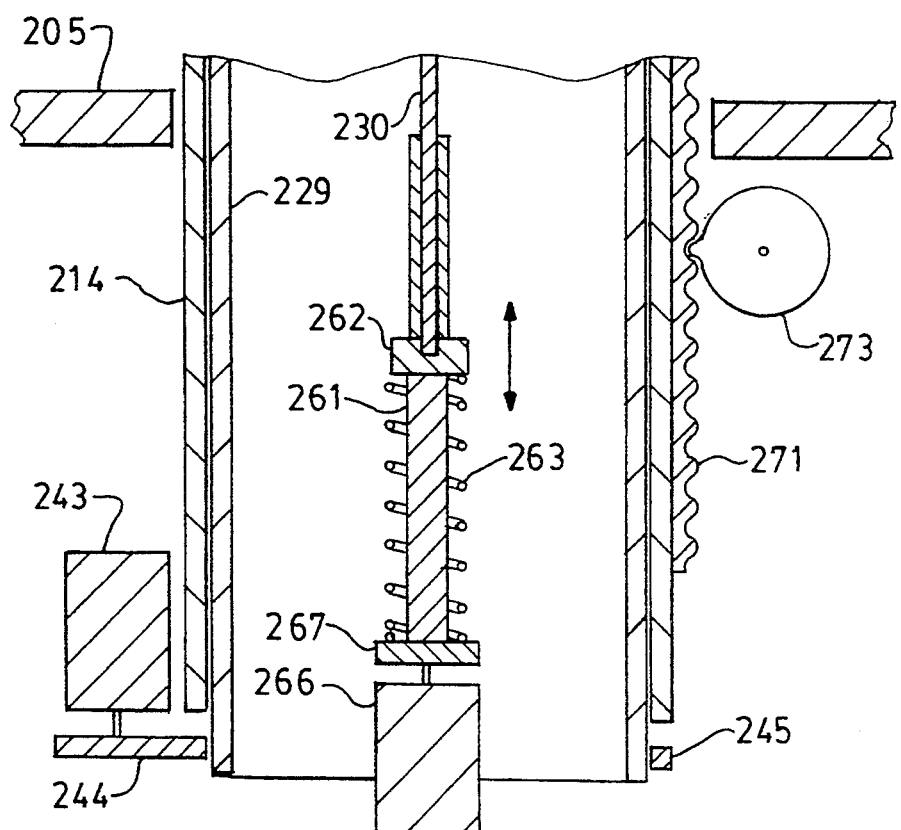
FIG. 8 illustrates a sectional view of an alternative embodiment of the interior portion of the boom of the docking mechanism.
Figure 7:
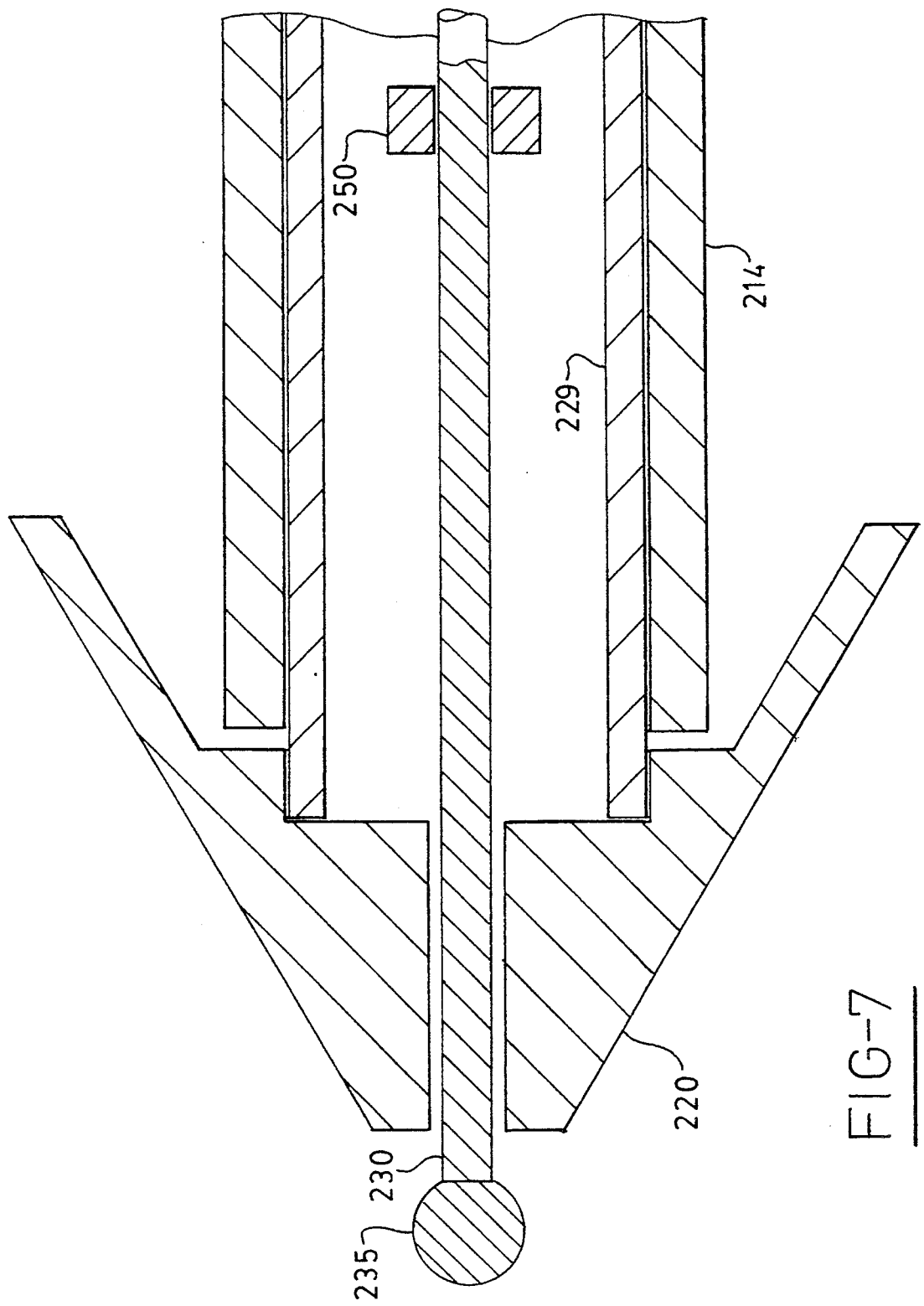
FIG. 7 illustrates a sectional view of an alternative embodiment of the rotatable cone of the docking mechanism.

FIGS. 5 to 8 illustrate further details of boom 210. FIG. 5 illustrates the exterior end of boom 210 including convex cone section 220 of a first embodiment. FIG. 6 illustrates the interior end of boom 210 including the mechanism for extension and retraction of boom 210 and cable 230 of this first embodiment. FIGS. 7 and 8 are similar to FIGS. 5 and 6, except that they illustrate a alternative embodiment.

FIG. 5 illustrates a sectional view of the exterior end of boom 210. FIG. 5 illustrates cable 230 and ball 235 in a nearly fully retracted position. Boom 210 includes outer cylindrical wall 211 with an end cap 213. End cap 213 includes a central opening with a sleeve bearing rotatably accommodating cylinder 223. Cylinder 223 joins convex cone section 220 near its apex. Cylinder 223 accommodates the entry of cable 230 into boom 210.

The interior of convex cone section 220 includes an interior gear surface 221. This interior gear surface 221 mates with gear 241 that is bidirectionally rotated by motor 240. Thus motor 240 can rotate convex cone section 220 relative to the outer cylindrical wall 211 of boom 210. Note that cylinder 223 rotates with convex cone section 220 via sleeve bearing in end cap 213. The coupling between motor 240 and spur gear 241 may be a simple shaft as illustrated or may include a clutch and energy absorbing brake. In any event motor 240 enables rotation between the first spacecraft 100 and second spacecraft 200. Convex cone section 220 and end cap 213 may include respective braking surfaces 227 and 217. Tension on ball 235 via cable 230 can cause braking surface 227 to meet braking surface 217. Release of this tension enables wave washer spring 225, which is between end cap 213 and convex cone section 220, to separate the two braking surfaces 227 and 217. The tension may be only partly released, reducing by not eliminating the braking force of the two braking surfaces 227 and 217. This permits control of rotary motion between first spacecraft 100 and second spacecraft 200.

Boom 210 optionally includes an emergency release mechanism. There is a possibility that the capture mechanism of first spacecraft 100 cannot be made to release ball 235. Without some emergency release mechanism it would then be impossible to separate second spacecraft 200. A pyrotechnic cable cutter 250 surrounds cable 230. Pyrotechnic cable cutter 250 is constructed in the same manner as known explosive bolt cutters used in spacecraft. Pyrotechnic cable cutter 250 may be activated to cut cable 230 upon failure of the capture mechanism to release ball 235. Thus the spacecraft can be separated.

FIG. 6 illustrates a sectional view of the portion of boom 210 interior to spacecraft 200. Cable 230 joins traveling nut 262 that travels on screw 261. Spring 263 urges traveling nut 262 in the direction of extension of cable 230. This serves to keep a predetermined extension force on cable 230 to combat possible kinking of cable 230. Motor 266 may bidirectionally rotate screw 261 via gears 264 and 265. This provides the mechanism for extension and retraction of ball 235 on cable 230. One side of outer cylindrical wall 211 includes rack 271. A motor driven pinion gear 273 engages rack 271. This enables extension and retraction of boom 210 relative to second spacecraft 200. The motor driving pinion gear 273 preferably includes the capability for dynamic braking. This dynamic braking dissipates the kinetic energy of the closing velocity between first spacecraft 100 and second spacecraft 200. As an alternative a friction brake may be used to dissipate the kinetic energy of the closing velocity of the spacecraft.

FIGS. 7 and 8 illustrate an alternative embodiment of cylindrical boom 210. The alternative embodiment of FIGS. 7 and 8 differs from the embodiment of FIGS. 5 and 6 primarily in the drive for rotation of convex cone 220 and in the diameter of cylindrical boom 210. In the alternative embodiment, convex cone 220 is rigidly coupled to an inner cylinder 229. This inner cylinder 229 may freely rotate inside a fixed cylinder 214, which forms the outer wall of cylindrical boom 220. Motor 243, disposed at the interior end of cylindrical boom 210, controls rotation of convex cone 220 via spur gear 244 and exterior gear 245, which is coupled externally to inner cylinder 229. Placement of motor 243 in this location permits fixed cylinder 214 to have a smaller diameter than outer cylindrical wall 211. As in the case of motor 240 described in conjunction with FIG. 5, motor 243 preferably includes a clutch and an energy absorbing brake. This narrower diameter may require in line mounting of motor 267 with flange 267 retaining spring 263.

We claim:

1. An automatic capture mechanism for a spacecraft comprising:

a concave cone section having a first end with a first diameter and a second end with a second diameter smaller than said first diameter, said second diameter selected for admission of a ball of a predetermined diameter;

an end cylinder having a first end connected to said second end of said concave cone section and a second end;

a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;

a capture biasing device coupled to said capture device for urging said capture device toward said capture position; and a trip mechanism disposed within said end cylinder at said second end for normally holding said capture device in said release position by restraining said capture biasing device, said trip mechanism capable of being tripped by a ball of said predetermined diameter to permit said capture biasing device to urge said capture device toward said capture position;

said end cylinder including a plurality of capture holes disposed said first end;

said capture device including a plurality of capture balls equal in number to the number of capture holes in said end cylinder, each capture ball disposed in a corresponding one of said plurality of capture holes in said end cylinder, each capture ball intruding into said end cylinder when said capture device is in said capture position and withdrawing into said capture hole when said capture device is in said release position;

said capture device further including an outer sliding cylinder disposed outside of and concentric with said end cylinder, said outer sliding cylinder having a capture ball groove for receiving said balls in said release position, said capture groove having a sloped edged that is urged toward said capture balls by said capture biasing device whereby upon tripping of said trip mechanism said capture biasing device urges said sloped edge of said capture groove into said capture balls thereby intruding each capture ball into said end cylinder;

said end cylinder including a plurality of trip holes disposed rearwardly of said plurality of capture holes;

said capture device including a plurality of trip balls equal in number to the number of trip holes in said end cylinder, each trip ball disposed in a corresponding one of said plurality of trip holes in said end cylinder, each trip ball intruding into said end cylinder when said capture device is in said capture position and withdrawing into said trip hole when said capture device is in said release position;

said outer sliding cylinder further including a release groove for receiving said trip balls in said release position, said release groove having a sloped edge that is urged toward said trip balls by said capture biasing device;

said trip mechanism including an inner sliding cylinder disposed within and concentric with said end cylinder opposite said trip holes having a trip shoulder for retaining said trip balls in said release position and a trip groove for receiving said trip balls in said capture position, said trip groove having a sloped edge facing towards said first end of said end cylinder and a trip biasing device for urging said sloped edge of said inner sliding cylinders toward said trip balls, wherein in said release position said trip shoulder of said inner sliding cylinder retains each of said trip balls in said release grooves of said end cylinder retaining said end cylinder in said release position and pressure on said inner sliding cylinder toward said second end of said end cylinder of a force to overcome said trip biasing device permits said trip balls to intrude into said end cylinder at said trip groove of said inner sliding cylinder thereby permitting said capture biasing device to force said capture balls into said end cylinder.

2. An automatic capture mechanism for a spacecraft comprising:

a concave cone section having a first end with a first diameter and a second end with a second diameter smaller than said first diameter, said second diameter selected for admission of a ball of a predetermined diameter;

an end cylinder having a first end connected to said second end of said concave cone section and a second end;

a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;

a capture biasing device coupled to said capture device for urging said capture device toward said capture position; and a trip mechanism disposed within said end cylinder at said second end for normally holding said capture device in said release position by restraining said capture biasing device;

said trip mechanism capable of being tripped by a ball of said predetermined diameter to permit said capture biasing device to urge of said capture device toward said capture position;

said end cylinder including a plurality of capture holes disposed in said first end;

said capture device including a plurality of capture balls equal in number to the number of capture holes in said end cylinder, each capture ball disposed in a corresponding one of said plurality of capture holes in said end cylinder, each capture ball intruding into said end cylinder when said capture device is in said capture position and withdrawing into said capture hole when said capture device is in said release position;

said capture device further including an outer sliding cylinder disposed outside of and concentric with said end cylinder, said outer sliding cylinder having a capture ball groove for receiving said balls in said release position, said capture groove having a sloped edge that is urged towards said capture balls by said capture biasing device whereby said tripping of said trip mechanism by said biasing device urges said sloped edge of said capture groove into said capture balls thereby intruding each capture ball into said end cylinder;

said capture mechanism further including a setting device connected to said outer sliding cylinder for moving said outer sliding cylinder against said capture biasing device to a position permitting said trip mechanism to hold said capture device in said release position by retraining said capture biasing device;

said setting device including a lever connected to said outer sliding cylinder and a push rod disposed to engage said lever, pressure on said push rod effective to move said lever to set said trip mechanism.

3. An automatic docking mechanism for a spacecraft comprising:

a ball having a predetermined diameter;

a cable attached to said ball; and a cable drive mechanism coupled to said cable for selective extension of said ball from the spacecraft and retraction of said ball into the spacecraft via said cable;

a convex cone section having a first end with a first diameter and a second end with a second diameter smaller than said first diameter and having an apex hole with said cable disposed therethrough; and a rotary drive mechanism coupled to said convex cone section for rotation of said convex cone section relative to the spacecraft.

4. An automatic capture and docking mechanism for a pair of spacecraft comprising:

a passive capture mechanism disposed on a first spacecraft including a concave cone section having a first end with a first diameter and a second end with a second diameter smaller than said first diameter, said second diameter selected for admission of a ball of a predetermined diameter, an end cylinder having a first end connected to said second end of said concave cone section and a second end, a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;

a capture biasing device coupled to said capture device for urging said capture device toward said capture position; and a trip mechanism disposed within said end cylinder at said second end for normally holding said capture device in said release position by restraining said capture biasing device, said trip mechanism capable of being tripped by a ball of said predetermined diameter to permit said capture biasing device to urge said capture device toward capture position; and a docking mechanism disposed on a second spacecraft including a convex cone section constructed to mate with said concave cone section and having an apex hole, a ball having said predetermined diameter, a cable attached to said ball and threaded through said apex hole of said convex cone section, and a cable drive mechanism coupled to said cable for selective extension of said ball from the second spacecraft and retraction of said ball to the second spacecraft via said cable;

said end cylinder including a plurality of capture balls disposed in said first end; and said capture device including a plurality of capture balls equal in number to the number of capture holes in said end cylinder, each capture ball disposed in a corresponding one of said plurality of capture holes in said end cylinder, each capture ball intruding into said end cylinder when said capture device is in said capture position and withdrawing into said capture hole when said capture device is in said release position, and an outer sliding cylinder disposed outside of and concentric with said end cylinder, said outer sliding cylinder having a capture ball groove for receiving said balls in said release position, said capture groove having a sloped edge that is urged toward said capture balls by said capture biasing device whereby upon tripping if said trip mechanism said capture biasing device urges said sloped edge of said capture groove into said capture balls thereby intruding each capture ball into said end cylinder.

5. An automatic capture and docking mechanism for a pair of spacecraft comprising:

a passive capture mechanism disposed on a first spacecraft including a concave cone section having a first end with a first diameter and a second end with a second diameter smaller than said first diameter, said second diameter selected for admission of a ball of a predetermined diameter, a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;

a capture biasing device coupled to said capture device for urging said capture device toward said capture position; and a trip mechanism disposed within said end cylinder at said second end for normally holding said capture device in said release position by restraining said capture biasing device, said trip mechanism capable of being tripped by a ball of said predetermined diameter to permit said capture biasing device to urge said capture device toward capture position; and a docking mechanism disposed on a second spacecraft including a convex cone section constructed to mate with said concave cone section and having an apex hole, a ball having said predetermined diameter, a cable attached to said ball and threaded through said apex hole of said convex cone section, and a cable drive mechanism coupled to said cable for selective extension of said ball from the second spacecraft and retraction of said ball to the second spacecraft via said cable;

said end cylinder including a plurality of capture holes disposed in said first end;

said capture device including a plurality of capture balls equal in number to the number of capture holes in said end cylinder, each capture ball disposed in a corresponding one of said plurality of capture holes in said end cylinder, each capture ball intruding into said end cylinder when said capture device is in said capture position and withdrawing into said capture hole when said capture device is in said release position, and an outer sliding cylinder disposed outside of and concentric with said end cylinder, said outer sliding cylinder having a capture ball groove for receiving said balls in said release position, said capture groove having a sloped edge that is urged toward said capture balls by said capture biasing device whereby upon tripping if said trip mechanism said capture biasing device urges said sloped edge of said capture groove into said capture balls thereby intruding each capture ball into said end cylinder;

said passive capture mechanism further including a setting device connected to said outer sliding cylinder for moving said outer sliding cylinder against said capture biasing device to a position permitting said trip mechanism to hold said capture device in said release position by restraining said capture biasing device;

said device including a lever connected to said outer cylinder and a push rod disposed to engage said lever, pressure on said push rod effective to move said lever to said set trip mechanism; and said docking mechanism further including a thrust mechanism for engaging said push rod of said setting device for setting said passage capture mechanism.

6. An automatic capture and docking mechanism for a pair of spacecraft comprising:

a passive capture mechanism disposed on a first spacecraft including a concave cone section having a first end with a first diameter and a second end with a second diameter smaller than said first diameter, said second diameter selected for admission of a ball of a predetermined diameter, an end cylinder having a first end connected to said second end of said concave cone section and a second end, a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;

a capture biasing device coupled to said capture device for urging said capture device toward said capture position; and a trip mechanism disposed within said end cylinder at said second end for normally holding said capture device in said release position by restraining said capture biasing device, said trip mechanism capable of being tripped by a ball of said predetermined diameter to permit said capture biasing device to urge said capture device toward capture position; and a docking mechanism disposed on a second spacecraft including a convex cone section constructed to mate with said concave cone section and having an apex hole, a ball having said predetermined diameter, a cable attached to said ball and threaded through said apex hole of said convex cone section, and a cable drive mechanism coupled to said cable for selective extension of said ball from the second spacecraft and retraction of said ball to the second spacecraft via said cable;

said end cylinder including a plurality of capture holes dispose din said first end;

said capture device including a plurality of capture balls equal in number to the number of capture holes in said end cylinder, each capture ball disposed in a corresponding one of said plurality of capture holes in said end cylinder, each capture ball intruding into said end cylinder when said capture device is in said capture position and withdrawing into said capture hole when said capture device is in said release position, and an outer sliding cylinder disposed outside of and concentric with said end cylinder, said outer sliding cylinder having a capture ball groove for receiving said balls in said release position, said capture groove having a sloped edge that is urged toward said capture balls by said capture biasing device whereby upon tripping if said trip mechanism said capture biasing device urges said sloped edge of said capture groove into said capture balls thereby intruding each capture ball into said end cylinder;

said passive capture mechanism further including a setting device to said outer sliding cylinder for moving said outer sliding cylinder against said capture biasing device to a position permitting said trip mechanism to hold in said release position by restraining said capture biasing device;

said outer sliding cylinder further including a setting shoulder; and said setting device including a hammer disposed to engage said setting shoulder, said hammer formed of a magnetic material, a setting biasing device for urging said hammer away from said setting shoulder, and an electro magnet disposed to pull said hammer toward said setting shoulder, said electro magnet generating a force on said hammer greater than setting biasing device whereby said hammer is pulled into said setting shoulder with a force sufficient to move said outer sliding cylinder to said release position.

7. An automatic capture and docking mechanism for a pair of spacecraft comprising:

a passive capture mechanism disposed on a first spacecraft including a concave cone section having a first end with a first diameter and a second end with a second diameter smaller than said first diameter, said second diameter selected for admission of a ball of a predetermined diameter, an end cylinder having a first end connected to said second end of said concave cone section and a second end, a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;

a capture biasing device coupled to said capture device for urging said capture device toward said capture position; and a trip mechanism disposed within said end cylinder at said second end for normally holding said capture device in said release position by restraining said capture biasing device, said trip mechanism capable of being tripped by a ball of said predetermined diameter to permit said capture biasing device to urge said capture device toward capture position; and a docking mechanism disposed on a second spacecraft including a convex cone section constructed to mate with said concave cone section and having an apex hole, a ball having said predetermined diameter, a cable attached to said ball and threaded through said apex hole of said convex cone section, and a cable drive mechanism coupled to said cable for selective extension of said ball from the second spacecraft and retraction of said ball to the second spacecraft via said cable;

said end cylinder including a plurality of capture holes disposed in said first end;

said capture device including a plurality of capture balls equal in number to the number of capture holes in said end cylinder, each capture ball disposed in a corresponding one of said plurality of capture holes in said end cylinder, each capture ball intruding into said end cylinder when said capture device is in said capture position and withdrawing into said capture hole when said capture device is in said release position, and an outer sliding cylinder disposed outside of and concentric with said end cylinder, said outer sliding cylinder having a capture ball groove for receiving said balls in said release position, said capture groove having a sloped edge that is urged toward said capture balls by said capture biasing device whereby upon tripping if said trip mechanism said capture biasing device urges said sloped edge of said capture groove into said capture balls thereby intruding each capture ball into said end cylinder;

said passive capture mechanism further including a setting device connected to said outer sliding cylinder for moving said outer sliding cylinder against said capture biasing device to a position permitting said trip mechanism to hold said capture device in said release position by restraining said capture biasing device;

said setting device including
a lever connected to said outer sliding cylinder
a motor; and
a cam coupled to said motor and disposed relative to said lever capable of rotation via said motor to engage said lever and move said lever to said set trip mechanism.

8. An automatic capture and docking mechanism for a pair of spacecraft comprising:
a passive capture mechanism disposed on a first spacecraft including
a concave cone section having a first end with a first diameter and a second end with a second diameter smaller than said first diameter, said second diameter selected for admission of a ball of a predetermined diameter,
a capture device disposed at said first end of said end cylinder having a capture position intruding into said end cylinder and restricting the diameter of passage for capture of a ball of said predetermined diameter, and a release position retracted from said end cylinder permitting unrestricted passage of a ball of said predetermined diameter;
a capture biasing device coupled to said capture device for urging said capture device toward said capture position; and
a trip mechanism disposed within said end cylinder at said second end for normally holding said capture device in said release position by restraining said capture biasing device, said trip mechanism capable of being tripped by a ball of said predetermined diameter to permit said capture biasing device to urge said capture device toward capture position; and
a docking mechanism disposed on a second spacecraft including
a convex cone section constructed to mate with said concave cone section and having an apex hole,
a ball having said predetermined diameter,
a cable attached to said ball and threaded through said apex hole of said convex cone section, and
a cable drive mechanism coupled to said cable for selective extension of said ball from the second spacecraft and retraction of said ball to the second spacecraft via said cable;
said docking mechanism further including a rotary derive mechanism coupled to said convex cone section for rotation of said convex cone section relative to the spacecraft.

9. The automatic capture mechanism of claim 1, wherein:
said trip biasing device consists of a spring disposed to urge said inner sliding cylinder toward said concave cone section.

10. The automatic capture mechanism of claim 2, wherein:
said outer sliding cylinder further includes a setting shoulder; and
said setting device includes
a hammer disposed to engage said setting shoulder, said hammer formed of a magnetic material,
a setting biasing device for urging said hammer away from said setting shoulder, and
an electromagnet disposed to pull said hammer toward said setting shoulder, said electromagnet generating a force on said hammer greater than said setting biasing device whereby said hammer is pulled into said setting shoulder with impetus sufficient to move said outer sliding cylinder to said release position.

11. The automatic capture mechanism of claim 2, wherein:
said setting device includes
a lever connected to said outer sliding cylinder,
a motor, and
a cam coupled to said motor and disposed relative to said lever capable of rotation via said motor to engage said lever and move said lever to set said trip mechanism.

12. The automatic docking mechanism of claim 3, further comprising:
a brake associated with said rotary drive mechanism for dissipating rotary energy of said convex cone section relative to the spacecraft.

13. The automatic docking mechanism of claim 3, wherein:
said convex cone section includes an interior geared surface; and
said rotary drive mechanism includes
a rotary drive gear disposed to engage said interior geared surface of said convex cone section, and
a cone rotation motor coupled to said rotary drive gear for rotating said rotary drive gear for rotation of said convex cone section via said interior geared surface.

14. The automatic docking mechanism of claim 3, further comprising:
a cylindrical boom coupled to said convex cone section at said first end; and
a boom drive mechanism coupled to said cylindrical boom for selective extension of said cylindrical boom from the spacecraft and retraction of said cylindrical boom into the spacecraft.

15. The automatic docking mechanism of claim 14, further comprising:
a brake associated with said boom drive mechanism for dissipating energy of extension of said cylindrical boom from the spacecraft and retraction of said cylindrical boom into the spacecraft.

16. The automatic docking mechanism of claim 14, wherein:
said convex cone section includes an interior geared surface, an interior first washer bearing surface and an interior first braking surface;
said rotary drive mechanism includes
a rotary drive gear disposed to engage said interior geared surface of said convex cone section, and
a cone rotation motor coupled to said rotary drive gear for rotating said rotary drive gear for rotation of said convex cone section via said interior geared surface; said cylindrical boom further includes
an end cap disposed on the exterior end thereof having a second washer bearing surface disposed opposite said first washer bearing surface and a second braking surface disposed opposite said first braking surface;
said automatic docking mechanism further comprising a spring washer disposed between said first and second washer bearing surfaces for urging said first and second washer bearing surfaces apart, whereby a rotary braking force provided by said first and second braking surfaces is proportional to the degree of retraction of said ball into the spacecraft via said cable drive mechanism against said spring washer.

17. The automatic docking mechanism of claim 14, further comprising:
an inner cylinder coupled to said convex cone section and rotatably disposed interior to said cylindrical boom, said inner cylinder having an extending end interior to the spacecraft extending beyond said cylindrical boom; and
said rotary drive mechanism includes
an exterior geared surface disposed on said extending end of said inner cylinder,
a rotary drive gear disposed to engage said exterior geared surface of said extending end of said inner cylinder, and
a cone rotation motor coupled to said rotary drive gear for rotating said rotary drive gear for rotation of said convex cone section via said inner cylinder.

18. The automatic docking mechanism of claim 14, wherein:
said cylindrical boom includes a longitudinally disposed rack; and
said boom drive mechanism includes
a pinion gear disposed to engage said longitudinally disposed rack of said cylindrical boom, and
a boom drive motor coupled to said pinion gear for bidirectionally rotating said pinion gear for selective extension of said cylindrical boom from the spacecraft and retraction of said cylindrical boom into the spacecraft via said rack.

19. The automatic docking mechanism of claim 18, wherein:
said boom drive mechanism further includes
a boom drive brake disposed to dissipate kinetic energy of motion between the spacecraft and a docking spacecraft.

20. The automatic capture and docking mechanism for a pair of spacecraft of claim 4, wherein:
said passive capture mechanism wherein
said trip biasing device consists of a spring disposed to urge said inner sliding cylinder toward said concave cone section.

21. The automatic capture and docking mechanism for a pair of spacecraft of claim 6, wherein:
said docking mechanism further includes
a source of electric power for selectively actuating said electromagnet for setting said passive capture mechanism.

22. The automatic capture and docking mechanism for a pair of spacecraft of claim 7, wherein:
said docking mechanism further includes
a source of electric power for selectively actuating said motor for setting said passive capture mechanism.

23. The automatic capture and docking mechanism for a pair of spacecraft of claim 8, further comprising:
a brake associated with said rotary drive mechanism for dissipating rotary energy of said convex cone section relative to the spacecraft.

24. The automatic capture and docking mechanism for a pair of spacecraft of claim 8, wherein:
said docking mechanism wherein
said convex cone section includes an interior geared surface, and
said rotary drive mechanism includes
a rotary drive gear disposed to engage said interior geared surface of said convex cone section, and
a cone rotation motor coupled to said rotary drive gear for rotating said rotary drive gear for rotation of said convex cone section via said interior geared surface.

25. The automatic capture and docking mechanism for a pair of spacecraft of claim 8, wherein:
said docking mechanism further includes
a cylindrical boom coupled to said convex cone section at said first end and having a diameter substantially equal to said first diameter of said convex cone section, and
a boom drive mechanism coupled to said cylindrical boom for selective extension of said cylindrical boom from the second spacecraft and retraction of said cylindrical boom into the second spacecraft.

26. The automatic capture and docking mechanism for a pair of spacecraft of claim 25, wherein:
a brake associated with said boom drive mechanism for dissipating energy of extension of said cylindrical boom from the spacecraft and retraction of said cylindrical boom into the spacecraft.

27. The automatic capture and docking mechanism for a pair of spacecraft of claim 25, wherein:
said convex cone section includes an interior geared surface, an interior first washer bearing surface and an interior first braking surface;
said rotary drive mechanism includes
a rotary drive gear disposed to engage said interior geared surface of said convex cone section, and
a cone rotation motor coupled to said rotary drive gear for rotating said rotary drive gear for rotation of said convex cone section via said interior geared surface; said cylindrical boom further includes
an end cap disposed on the exterior end thereof having a second washer bearing surface disposed opposite said first washer bearing surface and a second braking surface disposed opposite said first braking surface;
said automatic docking mechanism further comprising a spring washer disposed between said first and second washer bearing surfaces for urging said first and second washer bearing surfaces apart, whereby a rotary braking force provided by said first and second braking surfaces is proportional to the degree of retraction of said ball into the spacecraft via said cable drive mechanism against said spring washer.

28. The automatic capture and docking mechanism for a pair of spacecraft of claim 25, wherein:
said docking mechanism wherein
an inner cylinder coupled to said convex cone section and rotatably disposed interior to said cylindrical boom, said inner cylinder having an extending end interior to the spacecraft extending beyond said cylindrical boom, and
said rotary drive mechanism includes
an exterior geared surface disposed on said extending end of said inner cylinder,
a rotary drive gear disposed to engage said exterior geared surface of said extending end of said inner cylinder, and a cone rotation motor coupled to said rotary drive gear for rotating said rotary drive gear for rotation of said convex cone section via said inner cylinder.

29. The automatic capture and docking mechanism for a pair of spacecraft of claim 25, wherein:
said docking mechanism wherein
said cylindrical boom includes a longitudinally disposed rack, and
said boom drive mechanism includes
a pinion gear disposed to engage said longitudinally disposed rack of said cylindrical boom, and
a boom drive motor coupled to said pinion gear for bidirectionally rotating said pinion gear for selective extension of said cylindrical boom from the second spacecraft and retraction of said cylindrical boom into the second spacecraft via said rack.

30. The automatic capture and docking mechanism of claim 29, wherein:
said docking mechanism wherein
said boom drive mechanism further includes
a boom drive brake disposed to dissipate kinetic energy of motion between the spacecraft and a docking spacecraft.

* * * * *